United States Patent [19]

Coleman

[11] Patent Number: 4,711,689

[45] Date of Patent: Dec. 8, 1987

[54] PROCESS FOR RECONSOLIDATED WOOD PRODUCTION

[75] Inventor: John D. Coleman, Surrey Hills, Australia

[73] Assignee: Commonwealth Scientific and Industrial Research Organization, Australia

[21] Appl. No.: 765,307

[22] PCT Filed: Nov. 23, 1984

[86] PCT No.: PCT/AU84/00240

§ 371 Date: Jul. 23, 1985

§ 102(e) Date: Jul. 23, 1985

[87] PCT Pub. No.: WO85/02366

PCT Pub. Date: Jun. 6, 1985

[30] Foreign Application Priority Data

Nov. 23, 1983 [AU] Australia .............................. PG2513

[51] Int. Cl.[4] .............................................. B32B 31/00

[52] U.S. Cl. .................................... 156/257; 156/259; 156/260; 156/264

[58] Field of Search ............... 156/242, 259, 260, 264, 156/62.8, 296, 257; 428/106

[56] References Cited

U.S. PATENT DOCUMENTS

| | | | |
|---|---|---|---|
| 3,325,324 | 6/1967 | Schmidt | 156/264 X |
| 4,112,162 | 9/1978 | Casselbrant | 428/106 |
| 4,122,236 | 10/1978 | Holman | 156/62.2 X |
| 4,232,067 | 11/1980 | Coleman | 144/2 R X |
| 4,273,581 | 6/1981 | Inoue | 264/120 |
| 4,377,649 | 3/1983 | Sweeney et al. | 156/328 X |
| 4,396,673 | 8/1983 | Ball et al. | 156/296 X |

FOREIGN PATENT DOCUMENTS 1401900 7/1973 United Kingdom .

*Primary Examiner*—Robert L. Spruill
*Assistant Examiner*—Steven P. Weihrouch
*Attorney, Agent, or Firm*—Sughrue, Mion, Zinn, Macpeak, and Seas

[57] ABSTRACT

Process for forming a reconsolidated wood product (22) from a flexible open lattice work web of naturally interconnected wood strands. Bonding agent is applied to the web, which is then subjected to compression to consolidate the web and form the product (22). A wax is applied to the web (14) before the application of bonding agent, to limit pick-up of the bonding agent. The compression of the web (14) is effected once in a direction generally normal to the median plane of the web and once in an edge to edge direction. The compression force may be only partly released, for a time, after the first compression.

12 Claims, 4 Drawing Figures

PROCESS FOR RECONSOLIDATED WOOD PRODUCTION

Australian Patent Specification No. 510,845 describes a reconsolidated wood product formed from at least one flexible open lattice work web of naturally interconnected wood strands generally aligned along a common grain direction, a substantial proportion of said strands being substantially discrete but incompletely separated from each other; said web having been consolidated by compression whilst substantially maintaining the wood strands aligned along said common grain direction and said strands being bonded together to hold them in juxtapositions assumed pursuant to said consolidation.

That patent specification also describes a process for forming a reconsolidated wood product from a flexible open lattice work web of naturally interconnected wood strands, said web being formed by partially rending natural wood so that said strands are generally aligned along a common grain direction, a substantial proportion of said strands being substantially discrete but incompletely separated from each other, said process comprising compressing the web to consolidate the strands whilst maintaining them such as to substantially extend in said original grain direction and bonding said strands together to hold them in juxtapositions assumed pursuant to said consolidation.

In one aspect the invention seeks to provide an improved process as above described and which permits a more economical use of bonding agent as used to bond the web strands together.

In accordance with this aspect of the invention there is provided a process as described above wherein said bonding is effected by use of a bonding agent and, prior to application of the bonding agent, the said web is subjected to a treatment in which its surface is coated with wax. Suitable waxes may be selected from the group comprising paraffin waxes but other waxes may be used.

In another aspect the invention seeks to improve the dimensional stability of the final product produced by the process of specification No. 510,845.

In this aspect, the invention contemplates effecting the compression step as in the process of Specification No. 510,845, by a first pressing causing application of compressive force in one direction transverse to the direction of extent of the grain of the web, at least partially releasing said compressive force, followed by a further pressing to effect compression either in said one direction or in a direction transverse thereto and also transverse to said direction of extent of the grain.

The invention is further described by way of example only with reference to the accompanying drawings in which.

Figure 1:
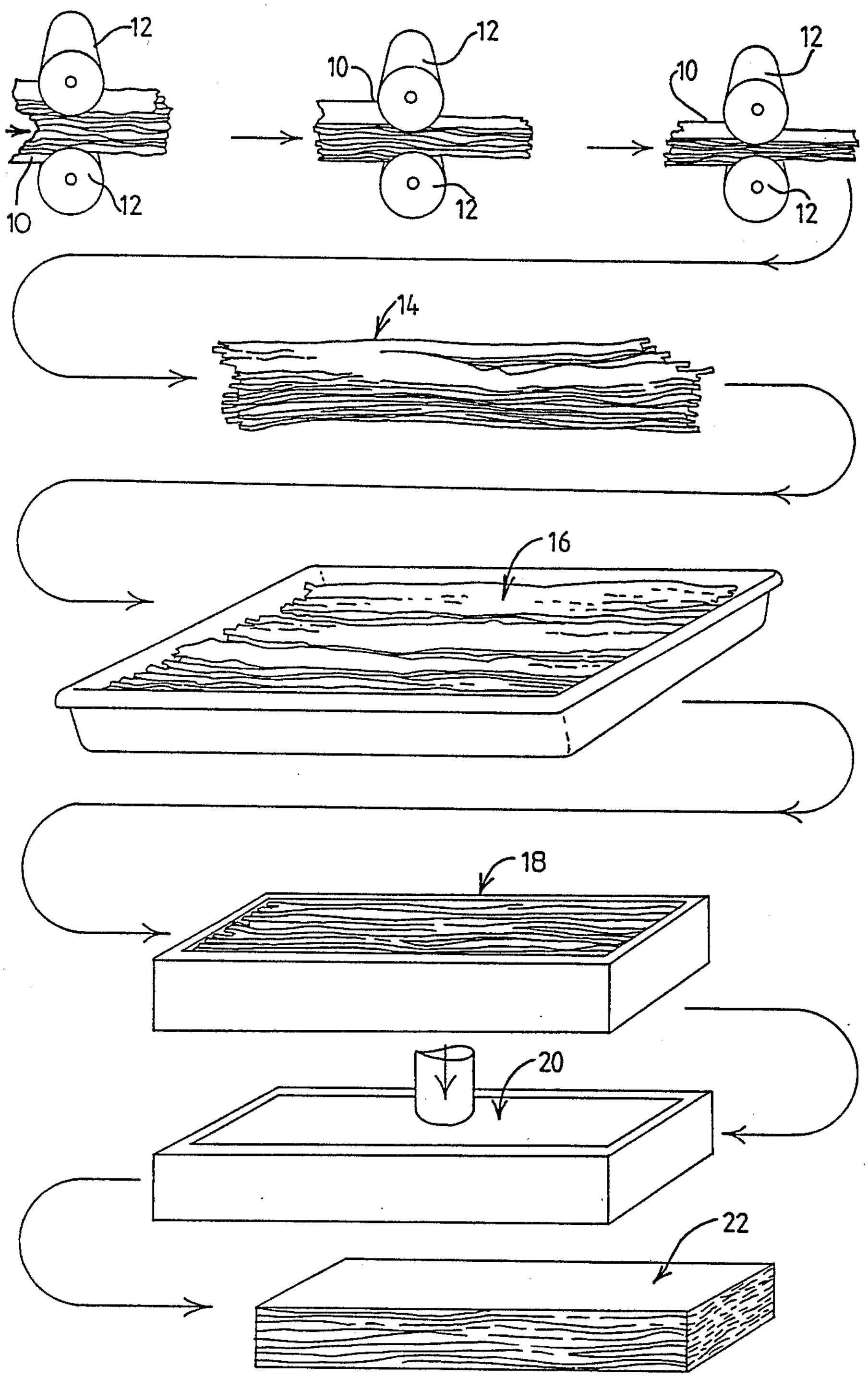
FIG. 1 is a diagram showing steps in the process as described in Patent Specification No. 510,845 for forming a reconsolidated wood product.

Referring firstly to FIG. 1, in the process of Australian Patent Specification No. 510,845 natural wood logs 10 are first partially broken down, being passed successively between rollers 12 of one or more roller pairs to induce cracking and thence progressively open up the log structure to form it into a web of loosely interconnected splinter-like strands (called "splinters" in Patent Specification No. 510,845). The resultant web, shown at 14 in FIG. 1, is of flexible open lattice work form, individual strands maintaining the original grain direction of the wood. Adhesive is then applied to the webs 14 such as by immersion in a suitable liquid adhesive in a bath 16 as shown. After removal of excess adhesive (by means not shown), a plurality of webs 14 are assembled together such that the individual webs in the assemblage are aligned in a common grain direction in a suitable mould 18. The assemblage of thus aligned webs is then consolidated in mould 18 such as by compression between the base of the mould and an upper press element 20 as shown, and the adhesive is cured, to form the final product 22.

Product 22 is characterized in that it comprises a plurality of wood strands which remain naturally interconnected and which extend generally in the original grain direction of the wood. The strands are bound together by the adhesive but are positioned in somewhat displaced relative locations as compared with the positions occupied in the original log 10. The product 22 has been found to be particularly satisfactory as it possesses good mechanical properties, due to the relatively small degradation of the original wood structure which is caused by the process, as well as good nailability and a generally pleasing appearance.

Figure 2:
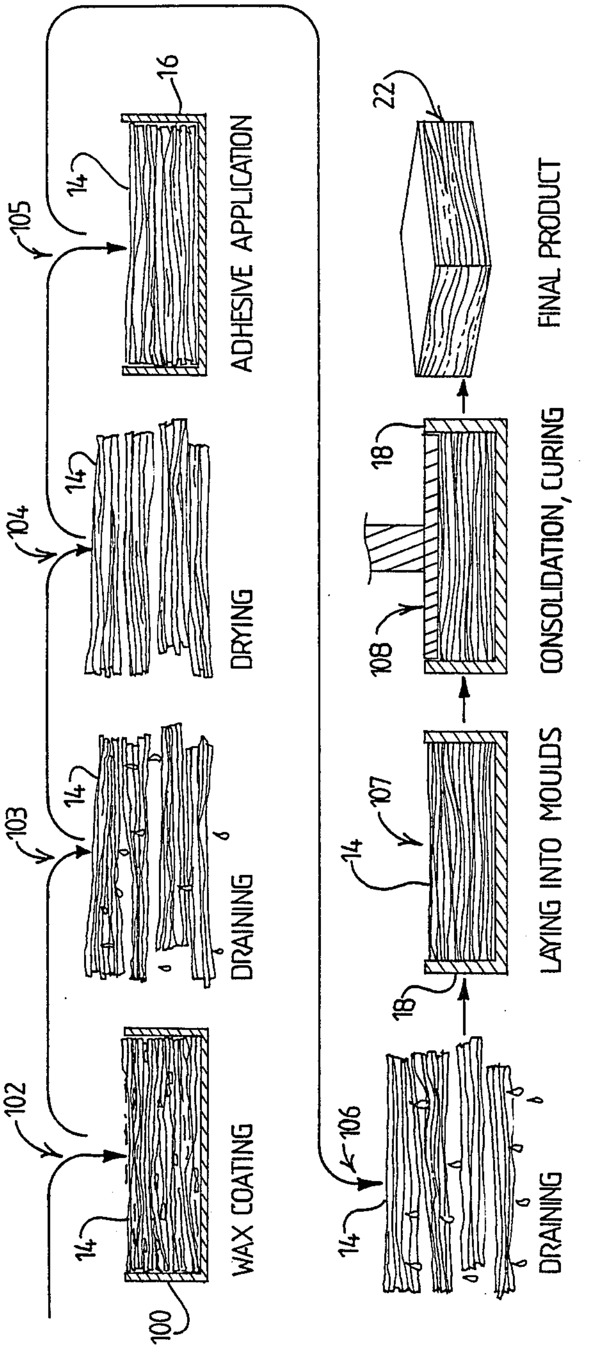
FIG. 2 illustrates a method of adhesive application involving prior wax coating.

Referring now to FIG. 2, there is shown diagrammatically an additional process step in accordance with this invention and which is not shown in the process as just described in FIG. 1. That is to say, before the application of adhesive in the bath 16, the surfaces of the webs 14 are coated in a bath 100 containing a liquid wax as shown at step 102 in FIG. 2. A suitable liquid wax may be an emulsion of paraffin wax in water but other types of liquid wax may be used.

After coating in the bath 100 the webs are removed therefrom, drained then dried as indicated at steps 103 and 104 in FIG. 2, and then passed to the aforementioned adhesive bath 16 as shown at step 105 in FIG. 2. Following adhesive application, the webs are removed, drained as shown at step 106 and then placed, for example, in the mould 18 (step 107). The webs are then subjected to pressure as previously described, whereafter, with the pressure maintained, the adhesive is permitted to cure. These latter steps are represented at 108 in FIG. 2. Thereafter, the formed final product 22 is removed.

With the above described process steps, wax coating as effected in bath 100 minimizes the amount of subsequent adhesive pick up so cutting down the required amount of adhesive. In that regard, in the absence of wax coating, a more substantial impregnation with adhesive may occur which is on the one hand unnecessary for the structural purposes of the invention and which, on the other hand, is wasteful of adhesive. Control of adhesive pick up is thus achieved by appropriately selecting the wax and the time for which the webs 14 remain in bath 100.

A further benefit from coating the webs 14 with wax is that the presence of wax thereon increases the resistance of the final product 22 to the ingress of water and thus in use enhances the durability of the resultant product.

Figure 3:
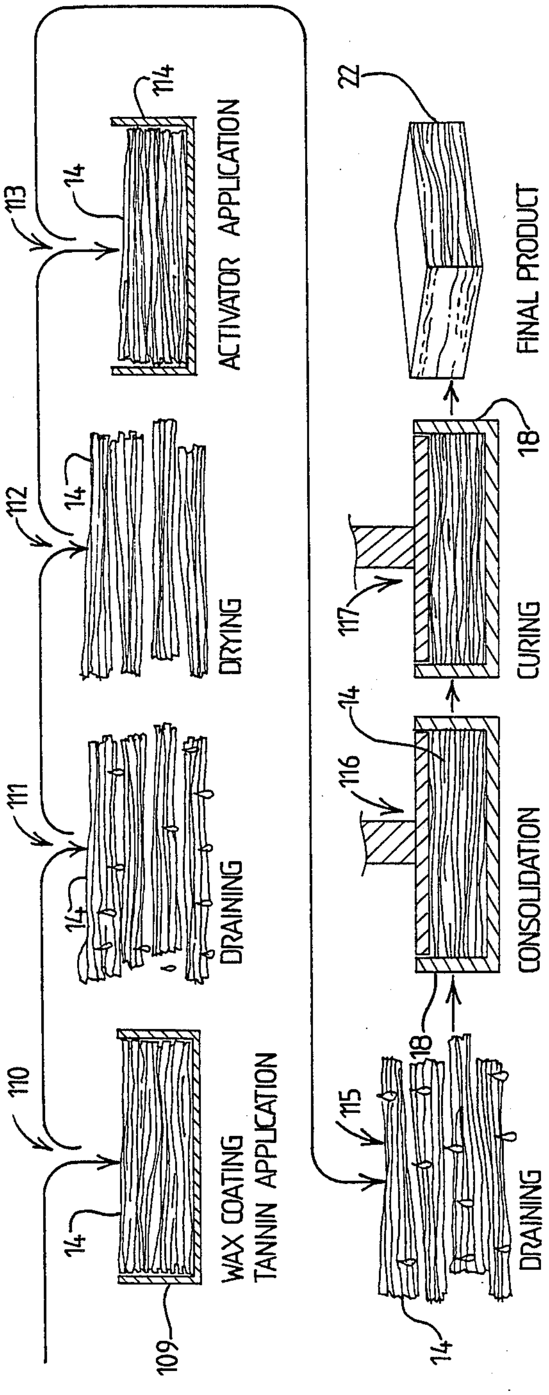
FIG. 3 is a diagram showing a variation of the process shown in FIG. 2.

FIG. 3 shows a variation of the process of FIG. 2 as applied in the case where the adhesive is a two-part composition. The adhesive may comprise a first component in the form of a solution of tannin powder in water and a second component in the form of a suitable activator such as hexamine dissolved in water. In such a process, the tannin solution may be mixed with the wax to form the bath 109 shown in FIG. 3 into which, at the step 110 shown, the webs 14 are immersed then removed therefrom. The webs are then drained (step 111) prior to subsequent drying (step 112), and passed to a bath 114 of the aforementioned activator (step 113). After immersion in the activator for a predetermined time, the webs are removed, drained (step 115) and then passed to the mould 18 for consolidation and curing as indicated at the steps 116, 117 which are performed in the same fashion as aforedescribed in relation to FIG. 2.

Figure 4:
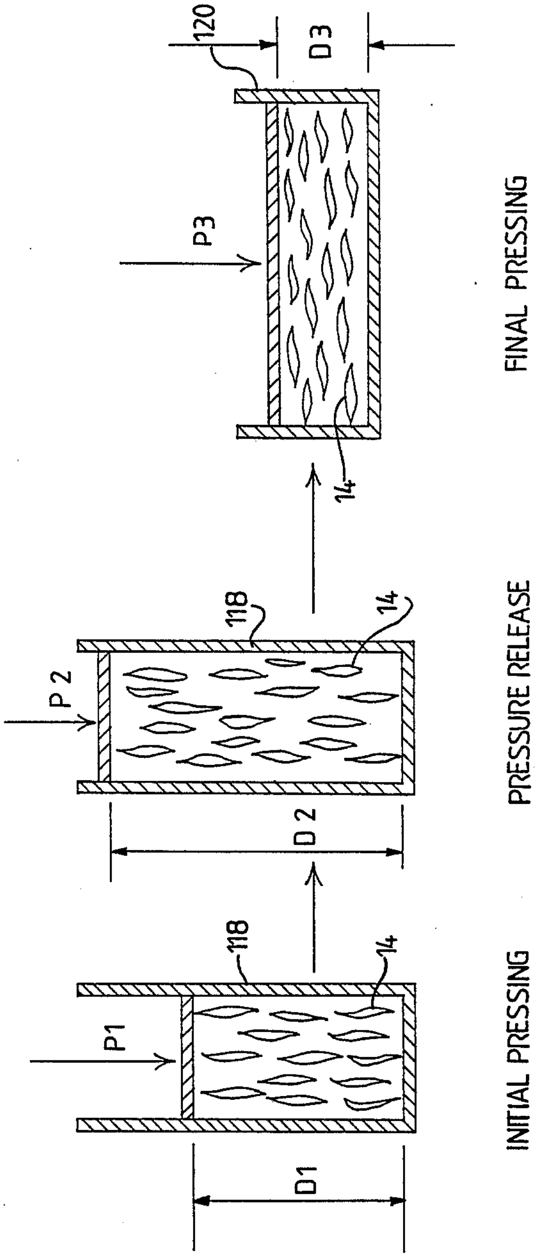
FIG. 4 is a diagram illustrating a preferred method of effecting compression of webs to form a reconsolidated wood product in accordance with this invention.

FIG. 4 illustrates a preferred method in accordance with this invention for effecting the consolidation step in FIG. 1. In this case, the webs 14 are first laid in a first press 118, (the webs being viewed end-on in FIG. 4). The webs 14 are then pressed from opposed sides in the press 118 by application of a pressure P1 which may be sufficient to, for example, compress the webs to about 50 percent of the desired final density. Thereafter, the pressure is released so that some expansion of the material again occurs. Thus, in this first pressing, the dimension of the webs may be reduced to the dimension D1 shown. Then, in a second step, re-expansion to a dimension D2 is permitted by release of pressure P1 to a lesser pressure P2. Where a hydraulic press is used for providing the pressure P1, the pressure P2 may be provided simply by releasing the hydraulic pressure so that only the weight of the compressing structure bears against the webs 14. After the second step, the webs 14 may be removed and placed in a second press 120 which is arranged to permit application of a pressure P3 in a direction which is transverse to the initial direction of application of pressure in press 118. This pressure P3 may be arranged to be such as to complete the final product and bring it to the desired end density and thickness D3. Curing of the adhesive bonding the webs 14 together may be allowed to be completed in the press 120 whilst the pressure P3 is maintained.

Although the above process is described as using two presses 118, 120 (for simplicity), it will be appreciated that it is possible to devise presses in which this processing is effected without the need to remove the webs from one press and insert them into another for completion of the process. In the described process, too, the pressing is shown, as is preferred, as being effected first in a direction parallel to the intended longer cross sectional dimension of the final product and thence normal to that cross sectional dimension. However, it is possible to reverse the order of pressing steps.

The described arrangement has been advanced merely by way of explanation and many modifications may be made thereto without departing from the spirit and scope of the invention as defined in the appended claims.

I claim:

1. A process for forming a reconsolidated wood product from a plurality of flexible open lattice work webs each of naturally interconnected wood strands, each said web being formed by partially rending natural wood so that said strands thereof are generally aligned along a common grain direction, a substantial proportion of said strands of each web being substantially discrete but incompletely separated from each other, said process comprising superposing said webs, compressing the superposed webs to consolidate the strands whilst maintaining them such as to substantially extend in said original grain direction and bonding said strands and webs together to hold them in juxtapositions assumed pursuant to said consolidation, wherein said bonding process comprises coating the strands of the webs with wax, applying a bonding agent to the strands whose impregnation into the natural wood of the strands is restricted by the wax coating, removing excess bonding agent from the superposed webs and curing the bonding agent during said compression and consolidation of the strands of the superposed webs.

2. A process according to claim 1 wherein said wax is selected from the group comprising paraffin waxes.

3. A process according to claim 1 wherein said wax coating is performed in a bath of the wax and wherein the time that the webs remain in the wax bath is controlled so as to control the quantity of bonding agent applied to the strands.

4. A process according to claim 1 the bonding agent is a one-part bonding agent and is applied to the strands subsequent to coating the strands with the wax.

5. A process according to claim 1 wherein the bonding agent is a two-part composition and said process comprises applying a first part of the bonding agent with the wax coating and subsequently applying a second part of the bonding agent which is in the form of an activator for the first part.

6. A process for forming a reconsolidated wood product from a plurality of flexible open lattice work webs each of naturally interconnected wood strands, each said web being formed by partially rending natural wood so that said strands thereof are generally aligned along a common grain direction, a substantial proportion of said strands of each web being substantially discrete but incompletely separated from each other, said proces comprising superposing said webs, compressing the superposed webs to consolidate the strands whilst maintaining them such as to substantially extend in said original grain direction and bonding said strands together to hold them in juxtapositions assumed pursuant to said consolidation, wherein said compressing is effected by a first pressing causing application of compressive force in one direction transverse to the direction of extent of the grain of the webs, at least partially releasing said compressive force to allow expansion of said webs, followed by a further pressing to effect compression in a direction transverse to said direction of extent of the grain, and wherein said bonding is effected by applying bonding agent to the webs and by curing the bonding agent in the superposed webs during said further pressing.

7. A process according to claim 6 wherein said further pressing is effected in a direction transverse to said one direction.

8. A process according to claim 7 wherein said first pressing and said further pressing are effected in directions which are normal to each other.

9. A process according to claim 6 wherein said further pressing is effected in said one direction.

10. A process according to claim 6 wherein said bonding agent is applied prior to the first pressing.

11. A process according to claim 6 wherein said webs are subjected to a treatment in which the surfaces of the strands are coated with wax prior to application of the bonding agent.

12. A process according to claim 11 wherein said wax is selected from the group comprising paraffin waxes.

* * * * *